US006295811B1

(12) United States Patent
Mangano et al.

(10) Patent No.: US 6,295,811 B1
(45) Date of Patent: Oct. 2, 2001

(54) VALVE DEVICE FOR A HYDRAULIC MOTOR ADAPTED TO DRIVE A HIGH INERTIA MASS

(75) Inventors: Alain Mangano, Vieux Moulin; Jean-Pierre Lebrun, Monceaux, both of (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/266,124

(22) Filed: Mar. 10, 1999

(30) Foreign Application Priority Data

Mar. 11, 1998 (FR) .......... 98 02967
Jul. 22, 1998 (FR) .......... 98 09354

(51) Int. Cl.[7] .......... F16D 31/02; F16K 31/12
(52) U.S. Cl. .......... 60/468; 137/505; 137/115.16
(58) Field of Search .......... 60/466, 468, 489; 137/505, 115.16

(56) References Cited

U.S. PATENT DOCUMENTS

| | | | | |
|---|---|---|---|---|
| 2,635,428 | * | 4/1953 | Marsh et al. | 60/468 |
| 2,852,918 | * | 9/1958 | Schwary | 137/115.16 X |
| 2,977,971 | * | 4/1961 | Ruhl | 60/468 X |
| 3,060,953 | * | 10/1962 | Harbidge | 137/115.16 X |
| 3,472,261 | * | 10/1969 | Brannon | 137/115.16 X |
| 3,747,350 | * | 7/1973 | West et al. | 60/466 X |
| 3,782,404 | * | 1/1974 | Hodgson | 137/115.16 X |
| 4,520,625 | | 6/1985 | Sato . | |
| 4,586,332 | | 5/1986 | Schexnayder . | |

FOREIGN PATENT DOCUMENTS

| | | |
|---|---|---|
| 3330849 | 3/1984 | (DE) . |
| 4418776 | 12/1994 | (DE) . |
| 0457913 | 11/1991 | (EP) . |
| 0793022 | 9/1997 | (EP) . |
| 2001852 | 10/1969 | (FR) . |
| 2393512 | 3/1978 | (FR) . |

OTHER PUBLICATIONS

Patent Abstracts of Japan, vol. 011, No. 218 Feb. 13, 1987 (62033945—JP).

Patent Abstracts of Japan, vol. 007, No. 005 Oct. 8, 1982 (57163703—JP).

* cited by examiner

*Primary Examiner*—John E. Ryznic
(74) *Attorney, Agent, or Firm*—Ladas & Parry

(57) ABSTRACT

This invention relates to a valve device for at least one hydraulic motor adapted to drive a high inertia mass. The device comprises two principal conduits, respectively intended to be connected to the two principal ducts (supply or exhaust) of the motor. It comprises a communication conduit for placing said principal conduits in situation of communication when the fluid pressures in these conduits are substantially equal and for placing said principal conduits in a situation of isolation in which they are isolated from one another when the fluid pressures in these two conduits are different. The device further comprises delaying means adapted to limit the speed of passage between the situation of communication and the situation of isolation. The communication conduit may include a calibrated restriction. Similarly, the delaying means may include calibrated restrictions.

22 Claims, 5 Drawing Sheets

VALVE DEVICE FOR A HYDRAULIC MOTOR ADAPTED TO DRIVE A HIGH INERTIA MASS

FIELD OF THE INVENTION

The present invention relates to a valve device for at least one hydraulic motor adapted to drive a high inertia mass, the motor having two principal ducts for fluid supply and exhaust, respectively, which are capable of being obturated to stop the motor. In the following description, the mass that the motor serves to drive will be referred to as "driven mass".

BACKGROUND OF THE INVENTION

The motor to which this valve device is applied serves for example to ensure rotation of the turret of a machine such as a hydraulic shovel, or to ensure translation of tracked or wheeled machines having a considerable mass.

This may be a hydraulic motor of the so-called "fast motor" type (1000 to 2000 rpm) driving a reduction gear, or a so-called "slow motor" (whose speed of rotation is for example of the order of 100 rpm, for example of the type incorporating radial pistons.

In operation, a circulation of fluid is maintained in the motor and one of the principal ducts is placed under pressure in order to perform the role of supply duct, while the other of these ducts is under relative depression and is connected to a fluid evacuation in order to perform the role of exhaust duct.

From an operational situation at a given drive velocity, stop of the motor is obtained by effecting a phase of deceleration, then by obturating the supply and exhaust ducts. During the phase of deceleration, the pressure in the supply duct becomes the low pressure, while the pressure in the exhaust duct becomes the high pressure. Finally, when the principal ducts of the motor are obturated, i.e. when this motor is isolated, the fluid located in the exhaust duct is at a pressure higher than that of the fluid located in the supply duct. This phenomenon is further reinforceed by the fact that, due to its high inertia, the driven mass tends to continue its initial movement.

On flat ground, equilibrium of the system is attained only when the pressures in the supply and exhaust ducts are substantially equal. On sloping ground or when the driven mass is in inclined position, equilibrium of the system is attained when the difference between the pressures in the supply duct and in the exhaust duct attains a given value (positive or negative) which makes it possible to compensate for the slope in order to maintain the mass immobile.

In any case, in order that the motor and the driven mass be effectively stopped in a stable position, the difference in pressure between the supply and exhaust ducts must attain a given value: zero, positive or negative.

It has been indicated hereinbefore that, when the supply and exhaust ducts are obturated, the exhaust duct is under excess pressure, which excess pressure is further increased by the inertia of the driven mass. Such excess pressure tends to push the driven mass in a return movement in the opposite direction, which amounts to tipping towards the supply duct which is obturated, the excess pressure of the exhaust duct which is also obturated.

Furthermore, the hydraulic fluid is slightly compressible. Consequently, after isolation of the motor, the inertia mass continues its movement until the pressure in the exhaust duct attains a maximum value corresponding to the compression of the fluid present in this duct. The effect of the return movement of the mass will be to increase the pressure in the supply duct until the fluid present in this duct is taken to a pressure of compression substantially equal to the maximum pressure which prevailed in the exhaust duct just before this return phase is started.

Of course, this return phase is followed by a new phase of displacement in the initial direction, during which there is produced a pressure reduction in the supply duct and a compression in the exhaust duct.

In this way, after obturation of the supply and exhaust ducts, the driven mass is animated by an oscillating movement of which the frequency, for turrets of machines such as hydraulic shovels, is of the order of 1 Hz. Although this oscillating movement has a low relative amplitude and it is finally braked naturally due to the phenomena of friction, it is obviously extremely inconvenient, particularly when it is question of placing the mass driven by the motor in a very precise position by stopping the motor without mechanical braking.

Paradoxically, this phenomenon of oscillating movement was less of a nuisance when the drives were effected with the aid of motors of lower performance, in which relatively considerable leakages limited the compression in the supply and exhaust ducts. The motors have been gradually improved, in particular to improve efficiency thereof, in order to reduce the duration of the phases of acceleration and to facilitate handlings under difficult conditions, for example in an inclined position.

In order to limit the oscillations, i.e. to reduce the amplitude thereof and finally to stop them, it is known to use a damping device consisting in creating, between the supply and exhaust ducts, leakages which supply a transfer volume. Further to the isolation of the motor, the difference in pressure between the supply and exhaust ducts may be at least partially compensated by the fluid available in this transfer volume.

Another system consists in permanently allowing leakages between the supply and exhaust ducts of the motor.

These systems are not entirely satisfactory insofar as, on the one hand, they amount to reducing the efficiency of the motor which, furthermore, it is sought to increase by improving this motor, and as they render a precise positioning of the driven mass when the motor has stopped, virtually impossible. In fact, for example when the motor serves to drive the turret of a hydraulic shovel, the effective stop of the turret will be effected with an angular deviation corresponding to the circulation of the fluid available in the transfer volume, with respect to the target angular position in which isolation of the motor has been controlled.

It is an object of the present invention to overcome the drawbacks set forth hereinabove by proposing a simple, reliable device which makes it possible to brake and cancel the oscillations of the system after isolation of the motor very rapidly, whatever the conditions of drive of the mass, in particular whether they be driven on sloping land or in inclined position, or on flat land.

SUMMARY OF THE INVENTION

This object is attained in that the device comprises two principal conduits, respectively intended to be connected to the two principal ducts of the motor; it comprises means for placing said principal conduits in situation of communication when the fluid pressures in these conduits are substantially equal and for placing said principal conduits in a situation of isolation in which these conduits are isolated from one another when the fluid pressures in these conduits are different; and it further comprises delaying means adapted to limit the speed of passage between the situation of communication and the situation of isolation.

As indicated hereinabove during deceleration then stop of the motor (obturation of the principal ducts of this motor), the fluid pressure in the exhaust duct is greater than the fluid pressure in the supply duct. Consequently, during the deceleration phase and up to stop of the motor, the principal conduits of the valve device according to the invention remain in the situation of isolation. Due to its considerable inertia, the driven mass continues its initial movement until the pressure in the delivery conduit reaches a maximum value (compression). From this situation, the driven mass starts a return movement during which the difference between the pressures in the exhaust and supply ducts decreases until it becomes substantially zero. At that moment, the two principal conduits of the device are placed in situation of communication, in which situation the volume of fluid in excess in the exhaust duct of the motor may be poured into the supply duct.

If the delaying means were not present, this situation of communication would be too brief to pour all the excess fluid in the exhaust duct into the supply duct. The mass connected to the motor naturally tending to continue its return movement, the pressure in the supply duct would thus become greater than the pressure in the exhaust duct, with the result that the device would again place the principal conduits in situation of isolation. Thus, it would simply be during the very brief time of passage of the oscillating mass through the neutral point of the oscillations (which is reproduced every semi-oscillation) that the principal conduits would be placed in situation of communication. The braking would be relatively slow, since the volume of fluid in excess in the exhaust duct of the motor would finally be totally poured in the supply duct only after a given number of passages through the situation of communication.

Thanks to the presence of the delaying means, as soon as the mass has described about half the return movement of the oscillations that it has just started, i.e. as soon as the pressures in the supply duct and in the exhaust duct become substantially equal, the principal conduits of the device according to the invention are arranged to be placed in situation of communication and tend to remain in this situation of communication for a sufficient length of time to allow at least a large part of the volume of excess fluid in the exhaust duct to pour into the supply duct. In this way, the mass connected to the motor is braked as soon as it has described half of a return movement and virtually does not move beyond.

The delaying means of the invention limit the speed of passage between the situation of communication and the situation of isolation, i.e. once the situation of communication is obtained, they make this situation last for at least a certain length of time (of the order of some tenths of second to one second), necessary for transferring the excess fluid in the exhaust duct towards the supply duct. It may also be considered that the delaying means serve to hinder the passage from the situation of communication to the situation of isolation.

According to a particularly advantageous embodiment, the means for placing the principal conduits in situation of communication comprise means forming a calibrated restriction, the cross-section of passage of the fluid capable of flowing through this restriction when the principal conduits are in situation of communication being much less than the current cross-section of the principal conduits (1% to 5% of this current cross-section).

This calibrated restriction is particularly useful when the motor is started from a situation in which the pressures in the supply and exhaust ducts are equal. In effect, to start the motor, the supply duct is supplied with fluid and, for the motor to function, this fluid must pass through the cylinders of the pistons before being evacuated through the exhaust duct. In other words, a drop in pressure must be rapidly installed between the supply and exhaust ducts. Thanks to the presence of the calibrated restriction, the fluid supplying the first principal conduit of the device will preferably go into the principal supply duct of the motor, only a small quantity of fluid then being able to “short-circuit” the motor and be evacuated via the second principal conduit of the device passing through the calibrated restriction. In this way, a considerable difference in pressure will be rapidly installed between the supply and exhaust ducts, this difference in pressure obviously having for its effect to place the principal conduits of the device in situation of isolation for the motor to function normally.

It will be understood that the delaying means and the calibrated restriction mentioned hereinabove must be chosen so as to be able effectively to ensure a delay, i.e. to hinder passage from situation of communication to the situation of isolation, while the ducts are no longer positively supplied with fluid, while allowing a rapid start of the motor, i.e. a passage which is as rapid as possible from the situation of communication to the situation of isolation when the ducts are supplied with fluid.

The device advantageously comprises a mobile member capable of being urged between three positions under the effect of the difference between the fluid pressures prevailing in the two principal conduits, these three positions comprising a first end position and a second end position in which the two principal conduits are in situation of isolation with respect to each other and an intermediate position in which said principal conduits are in situation of communication with each other, the mobile member being placed in its first end position when the pressure in the first principal conduit is greater than the pressure in the second principal conduit, while it is placed in its second end position when the pressure in the second principal conduit is greater than the pressure in the first principal conduit and it is placed in its intermediate position when the pressures in the two principal conduits are substantially equal.

This mobile member is preferably formed by a slide element mounted to slide in a bore of which a portion extends between the two principal conduits, this slide element being equipped with means forming a communication conduit which connects the principal conduits in the intermediate position of the slide element and which is obturated by the wall of the bore in the two end positions of the slide element.

The device advantageously comprises means for forming a first and a second control chamber, respectively located at a first and at a second end of the slide element, the first chamber communicating with the first principal conduit via a first passage for communication, while the second chamber communicates with the second principal conduit via a second passage for communication, the first control chamber being capable of being supplied with fluid in order to push the slide element towards its first end position when the fluid pressure in the first principal conduit becomes greater than the fluid pressure in the second principal conduit and of being emptied in order to allow the displacement of the slide element towards its second end position when the fluid pressure in the second principal conduit becomes greater than the fluid pressure in the first principal conduit, and the second control chamber being capable of being supplied with fluid in order to push the slide element towards its second end position when the fluid pressure in the second principal conduit becomes greater than the fluid pressure in the first principal conduit and of being emptied in order to allow the displacement of the slide element towards its first end position when the fluid pressure in the first principal conduit becomes greater than the fluid pressure in the second principal conduit.

These arrangements constitute a simple manner of hydraulically controlling the device according to the invention in order to obtain the two end positions of isolation and the intermediate position of communication.

According to a first advantageous embodiment of the delaying means, at least one of the first and second passages for communication may be provided to be equipped with a calibrated restriction in order to hinder flow of fluid through these passages.

As will be seen hereinbelow, the bottom of the control chambers may, alternately or complementarily, be provided to constitute a mobile stop for the corresponding ends of the slide element, this mobile stop being permanently returned by return means in the sense of reducing the volume of the control chambers.

BRIEF DESCRIPTION OF THE DRAWINGS

The invention will be more readily understood on reading the following detailed description of embodiments shown by way of non-limiting examples, with reference to the accompanying drawings, in which.

DESCRIPTION OF PREFERRED EMBODIMENTS

Figure 1:
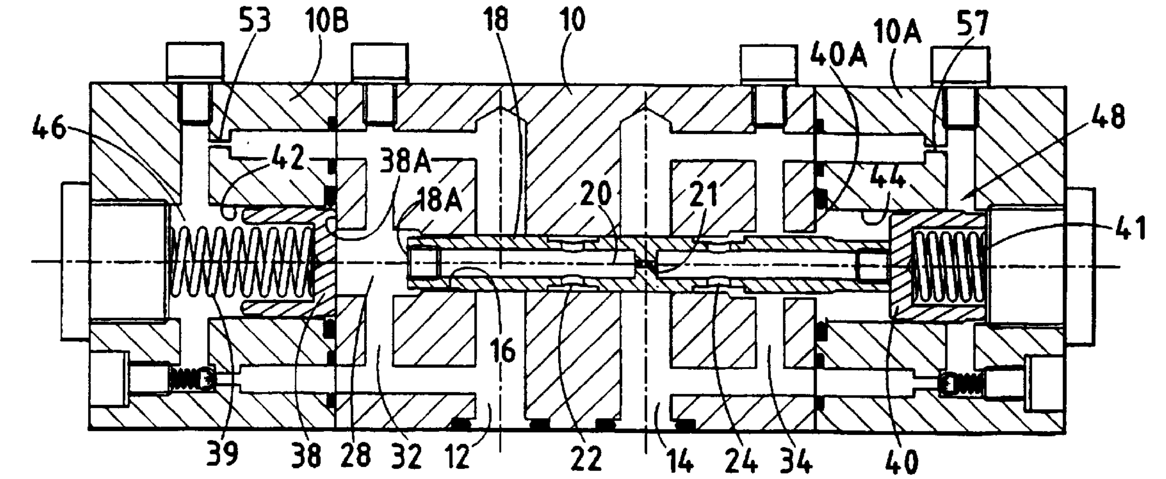
FIGS. 1 to 3 show, in axial section, a device according to the invention in accordance with a first embodiment, in three different situations.
Figure 2:
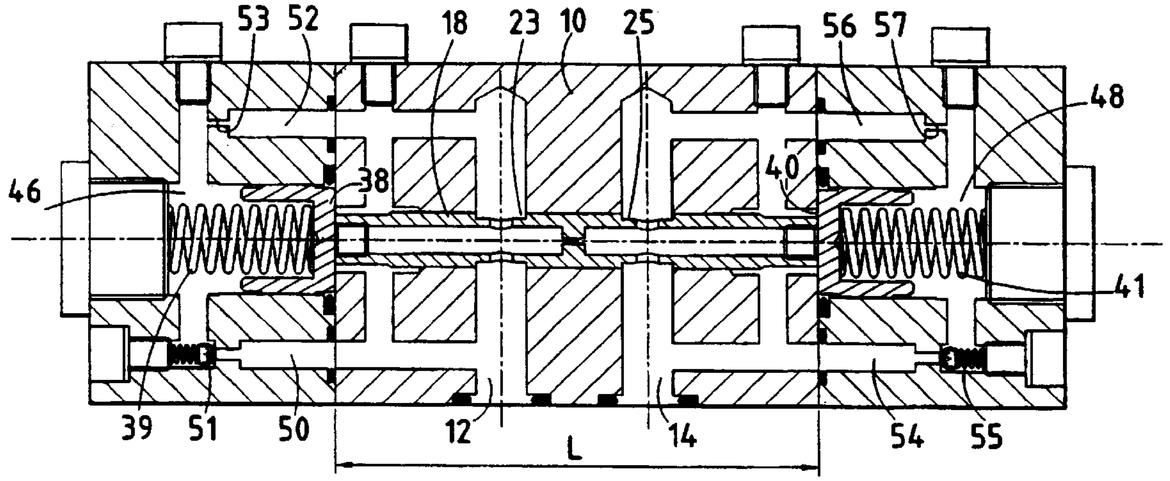
Figure 3:
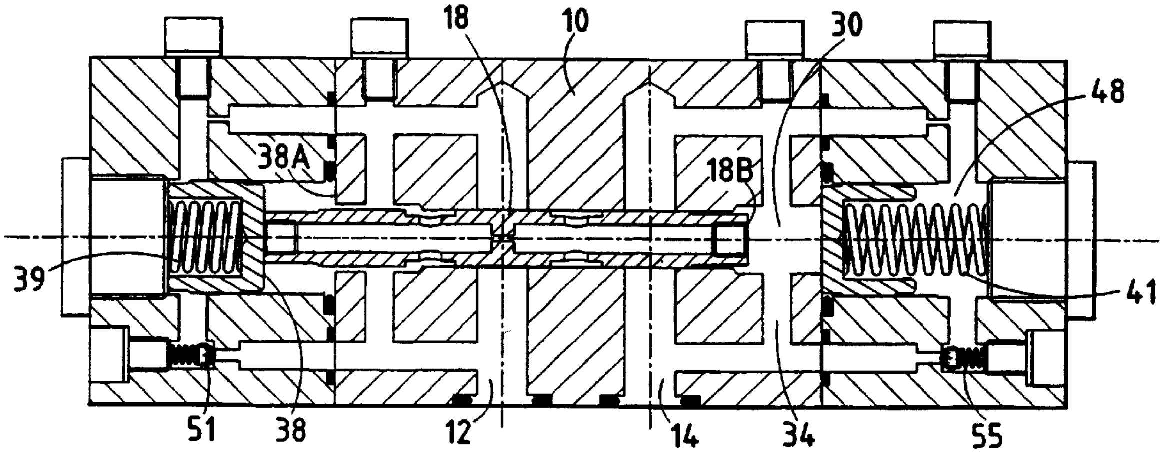

Referring now to the drawings, the device shown in FIGS. 1 to 3 comprises a body 10 in which are pierced two principal conduits 12 and 14, respectively intended to be connected to the supply and exhaust ducts of a hydraulic motor. A bore 16 is made in the body 10, this bore presenting a median portion which extends between the two principal ducts 12 and 14, on either side of which extend two end portions located beyond the conducts 12 and 14. A slide element 18 is slidably mounted in this bore, in which it may occupy three specific positions. The first, visible in FIG. 1, is a first end position in which the fluid pressure in the first principal conduit 12 is greater than the pressure in the second principal conduit 14 and in which the slide element isolates these two principal conduits. The slide element 18 may also occupy a second end position, shown in FIG. 3, which corresponds to the inverse situation in which the fluid pressure in the second principal conduit is greater than the pressure in the first principal conduit and in which the slide element isolates these two conduits. The slide element may also occupy a third position, which is an intermediate position illustrated in FIG. 2, in which the pressures in the conduits 12 and 14 are substantially equal and in which these conduits are placed in communication.

To that end, the slide element 18 comprises a communication conduit which, in the example shown, comprises a central bore 20, which opens out on the wall of the slide element via first orifices 22 and second orifices 24 which are spaced apart from one another in the direction of slide of the slide element, with the result that, in the first end position, the orifices 22 are obturated by the cylindrical wall of the bore 16, while in the intermediate position, the orifices 22 and 24 open out respectively in the first and second principal conduits 12 and 14 and, in the second end position shown in FIG. 3, the orifices 24 are obturated by the wall of the bore 16.

It is seen that orifices 22 and 24 are located in grooves 23 and 25 respectively, made on the outer periphery of the slide element, which makes it possible for the principal conduits 12 and 14 to remain in communication via the conduit 20 even when the slide element 18 is slightly offset towards one of its end positions from the intermediate position.

Conduit 20 comprises a portion with small cross-section of passage forming a calibrated retriction 21. As indicated previously, this restriction serves to generate a drop in pressure when the motor is started, i.e. when one of the conduits 12 and 14 is supplied with fluid with the supply duct of the motor to which it is connected.

Of course, FIGS. 1 to 3 show an embodiment of the communication conduit which comprises conduit 20, orifices 22 and 24 as well as restriction 21. It may be imagined to make the communication conduit differently, in particular by providing grooves, possibly stepped, to form the restriction 21 on the outer periphery of the slide element.

In order to control the slide element 18 between its three positions, the device comprises means for arranging first and second control chambers 28 and 30, respectively located at a first and at a second end 18A and 18B of the slide element. The first control chamber 28 is supplied with fluid via the first principal conduit 12, with which it communicates via a first passage 32 for communication. Similarly, the second control chamber 30 communicates with the second principal conduit 14 via a second passage 34 for communication. When the fluid pressure in the first conduit 12 becomes greater than the pressure in the second conduit 14, the first control chamber is supplied with fluid to push the slide element in its first position shown in FIG. 1. On the other hand, when the fluid pressure in the second principal conduit 14 is greater than the pressure in the first principal conduit 12, it is the second control chamber 30 which is supplied with fluid, as is seen in FIG. 3.

The Figures show that the control chambers 28 and 30 respectively present a first and a second mobile bottom wall, respectively designated by references 38 and 40. These bottom walls constitute stops with which the first and second ends of the slide element cooperate in order to limit the displacement of said slide element. The bottom walls 38 and 40 are mobile in the direction of translation of the slide element and the device comprises a first return means, comprising for example a first mechanical spring 39 adapted to return the bottom wall 38 permanently towards the end 18A of the slide element, i.e. towards a position in which it tends to decrease the volume of the first control chamber 28.

Similarly, the device comprises a second return means, comprising for example a mechanical spring 41 adapted to return the second bottom wall 40 permanently in the direction bringing it closer to the second end 18B of the slide element. In effect, the bottom walls 38 and 40 constitute the active faces of pistons mobile in bores 42 and 44, respectively made in pieces 10A and 10B which are added on the body 10 so that the bores 42 and 44 lie in line with the bore 16 in which the slide element 18 slides. Of course, fixation of pieces 10A and 10B on the body 10 is rendered tight by means of seals.

The mobility of the bottom walls 38 and 40 and the presence of the return means 39 and 41 makes it possible, as shown in FIG. 2, to render more stable the intermediate position of the slide element 18 in which it makes conduits 12 and 14 communicate. In effect, the system is dimensioned so that the minimum space between the bottom walls 38 and 40 when they are pushed to a maximum by the return means 39 and 41, corresponds substantially to the length L of the slide element 18.

Moreover, the return means 39 and 41 may in themselves contribute to the delaying, since, in order to be able move towards one of its end positions from its intermediate position, the slide element 18 must first push one of the bottom walls 38 and 40 against the stress exerted on this wall by the return means 39 or 41. However, it may be desirable not to make springs 39 and 41 too stiff, with the view, when the motor is started, to avoiding the slide element 18 having to overcome too great a resistant effort to be placed in one of its end positions which corresponds to normal functioning of the motor.

In fact, in the example of FIGS. 1 to 3, springs 39 and 41 constitute rathermore simple return means tending to replace the bottom walls 38 and 40 into their "advanced" positions once they have been pushed by the slide element, and the delaying means in themselves are made hydraulically.

The device shown in FIGS. 1 to 3 thus comprises a first and a second damping chamber respectively designated by references 46 and 48. The first damping chamber communicates with the first principal conduit 12 via a first communication and damping passage, which, for reasons which will be set forth hereinbelow, advantageously comprises two arms 50 and 52. Similarly, the second damping chamber communicates with the second principal conduit 14 via a second communication and damping passage which comprises two arms 54 and 56.

In a balanced situation, insofar as the first damping chamber 46 and the first control chamber 28 both communicate with the first principal conduit 12, the pressures are equal on either side of the piston forming the bottom wall 38. Despite this equality in pressure, the spring 39 therefore makes it possible to place this piston in its advanced position in FIGS. 1 and 2. In the same situation, the spring 41 enables the piston bearing the bottom wall 40 to be placed in its advanced position shown in FIGS. 2 and 3.

It is seen that arm 52 of the first communication and damping passage comprises a calibrated restriction 53 which limits the passage of the fluid in this region. Similarly, the arm 56 of the second communication and damping passage comprises a calibrated restriction 57. In the intermediate position shown in FIG. 2, the two damping chambers 46 and 48 are filled with fluid. From this situation, in order to allow passage of the slide element into its first end position shown in FIG. 1, it is necessary not only that the fluid supplying the first conduit 12 and entering in the first control chamber 28 tend to displace the slide element towards the right, but also that such displacement be allowed by the at least partial emptying of the damping chamber 48. The restriction 57 makes it possible to hinder flow of the fluid through the passage 56 when the chamber 48 empties. In other words, the restriction 57 makes it possible to "slow down" emptying of the chamber 48, which prevents the slide element from passing too quickly from its intermediate position to its first end position. Similarly, the restriction 53 "slows down" emptying of the chamber 46 when, the pressure in the principal conduit 14 becoming greater than the pressure in the conduit 12, the slide element tends to move from its intermediate position towards its second end position shown in FIG. 3.

As indicated hereinbefore, it is desirable to hinder displacement of the slide element towards one of its end positions from its intermediate position when the motor is stopped, while avoiding opposing restart of the motor. The different elements of the device according to the invention are dimensioned accordingly. For example, for hydraulic motors functioning up to pressures of 300 bars, a diameter of about 9 mm will be chosen for the principal conduits 12 and 14, a diameter of about 1 mm for the restriction 21, and, for the restrictions 53 and 57, a diameter of about 0.3 mm, while the stiffness of the springs 39 and 40 will be of the order of 1 N/mm.

Despite the presence of the restrictions 53 and 57, it may be desirable that the damping chambers 46 and 48 be able to be filled with fluid as quickly as possible in order that the pistons bearing the bottom walls 38 and 40 may resume their advanced positions very rapidly after having been pushed by the slide element. This is the reason for the existence of the arms 50 and 54 of the communication and damping passages, these arms constituting in fact a first and a second booster passage each equipped with a non-return valve 51, 55, in order to allow the circulation of the fluid from a principal conduit 12 or 14 in question only in the sense of filling the corresponding chamber 46 or 48.

The different conduits machined in the body 10, in pieces 10A and 10B and in the slide element 18, are closed by tight plugs. Furthermore, the advanced position of the bottom walls 38 and 40 is defined by their coming into abutment against wall elements 38A and 40A respectively, made at the interface between the body 10 and pieces 10A and 10B. The communication and damping conduits for the damping chambers 46 and 48 form extensions of the communication passages for the control chambers 28 and 30.

It will also be noted that the orifices 22 and 24 of the communication conduit made in the slide element 18 are disposed so that the orifices 22 communicate with the principal conduit 12 when the slide element occupies its second end position shown in FIG. 3, while the orifices 24 communicate with the second principal conduit 14 when the slide element occupies its first end position shown in FIG. 1.

The restrictions 53 and 57 may be directly made in the pistons which bear the bottom walls 38 and 40 if the passage between the damping chambers and the principal conduits is effected at that spot.

Furthermore, it is also possible to provide restrictions on the communication passages 32, 34 of the control chambers.

Figure 4:
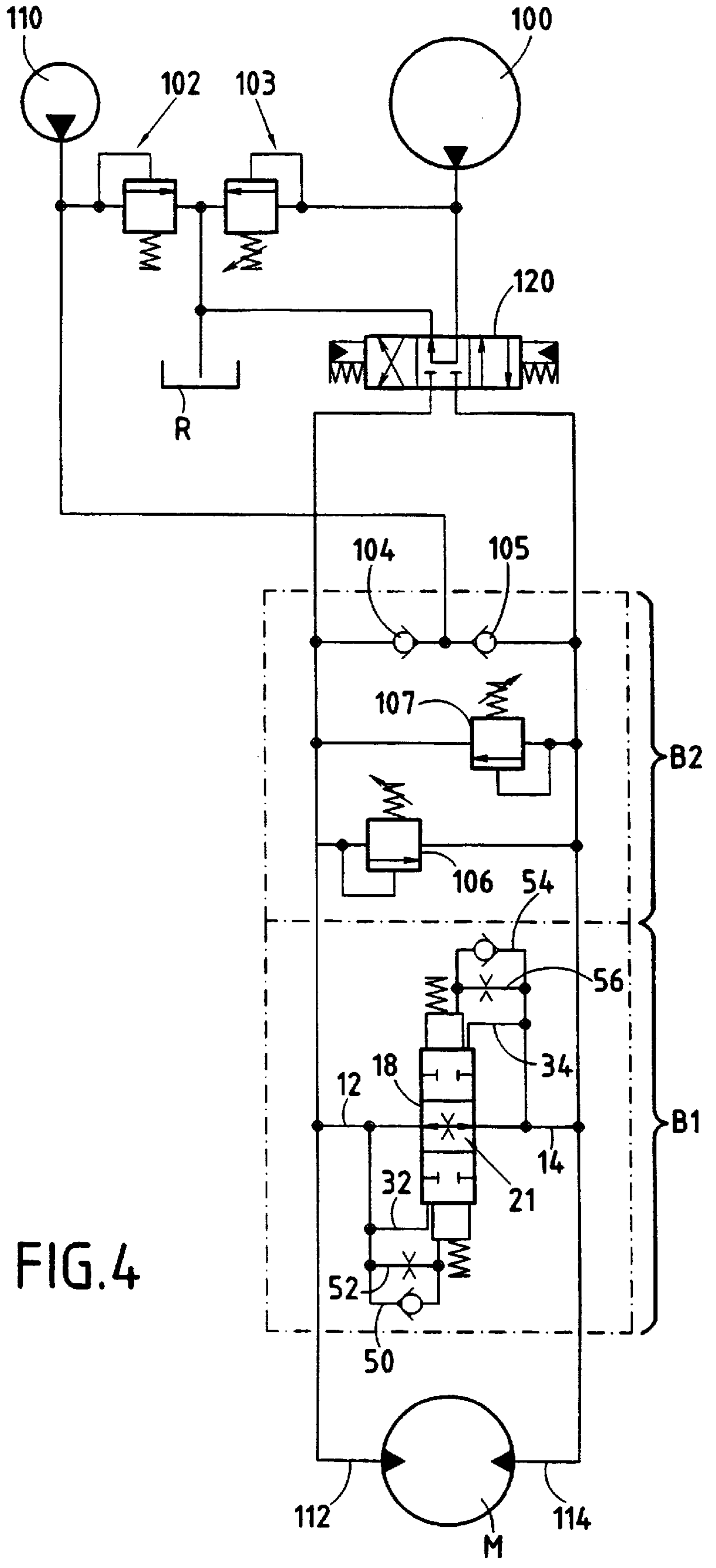
FIG. 4 illustrates a hydraulic circuit for supplying a hydraulic motor, incorporating a device according to FIGS. 1 to 3.

With reference to FIG. 4, a hydraulic circuit incorporating the device of FIGS. 1 to 3 shown schematically will now be described. This circuit is of the so-called "open circuit" type insofar as the hydraulic pump 100 which serves to supply motor M is a pump with only one direction of action, the exhaust of fluid being connected to a reservoir R at atmospheric pressure. Motor M comprises principal ducts 112 and 114 which, depending on the direction of action determined by one or the other of the end positions of a distribution valve 120, serve for the supply or exhaust of the motor. In manner known per se, the circuit also comprises a booster pump 110 and pressure limiters 102 and 103. FIG. 4 illustrates the situation of isolation of the motor, in which the valve 120 occupies an intermediate position which obturates the ducts 112 and 114, the fluid delivered by the pump 100 going directly to the reservoir R. The booster pump 110 serves to ensure a given minimum pressure in the ducts 112 and 114. In manner known per se, it is connected to these ducts by non-return valves 104 and 105, associated with pressure limiters 106 and 107.

The device of the invention is located in block B1 of FIG. 4. In effect, the standard representation of the slide element 18 mobile between three positions is recognized. In FIG. 4, it is shown in its intermediate position in which the conduits 12 and 14 of the device respectively connected to the principal ducts 112 and 114 of the motor M, are placed in communication via the communication passage comprising the calibrated restriction 21. The displacement of the slide element is controlled by the control chambers connected respectively to the conduits 12 and 14 by the communication passages 32 and 34. The passage of the slide element 18 from its intermediate position to one of its end positions is hindered by the damping chambers respectively connected to conduits 12 and 14 by the communication and damping passages each comprising their two arms 50, 52 and 54, 56 respectively. The whole of block B1 may form part of a hydraulic unit intended to be fixed on the casing of the hydraulic motor M. This block B1 may, with block B2 which comprises the non-return valves 104 and 105, as well as the pressure limiters 106 and 107, constitute the same hydraulic unit fixed ("flanged") on the casing of the motor. The motor may be a motor with single operational cubic capacity or with several cubic capacities, in which case the hydraulic unit comprising the block B1 may also comprise the means for selecting the cubic capacity of the motor. Furthermore, the device according to the invention has been shown associated with one motor M. Particularly for driving an extremely heavy mass in translation, it may be provided to use a group of several motors disposed in series or in parallel. In that case, this device may be associated with all the motors of this group, its first and second principal conduits 12 and 14 being respectively connected to the supply and exhaust lines of the motors of the group.

Figure 5:
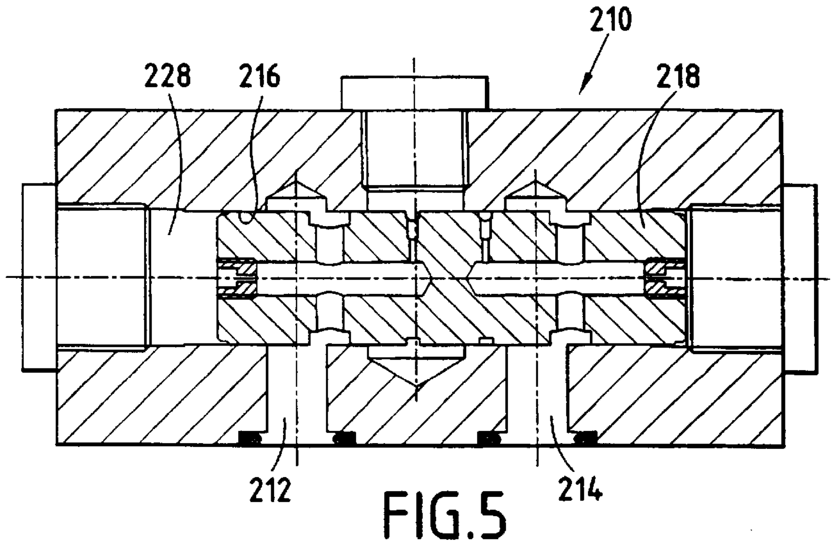
FIGS. 5 to 7 show a device according to the invention, in accordance with a second embodiment, in three different situations.
Figure 6:
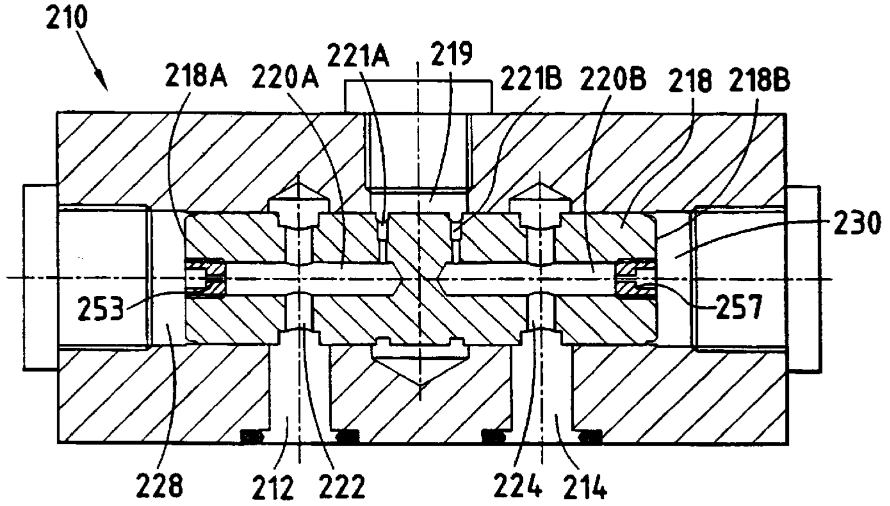
Figure 7:
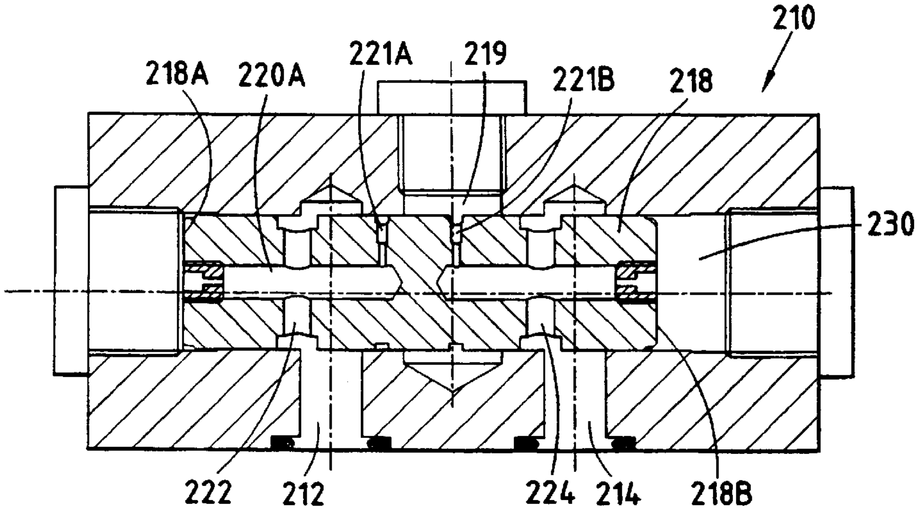

Reference will now be made to FIGS. 5 to 7 which show another embodiment of the device according to the invention. Elements common to the two embodiments are given the same references in FIGS. 5 to 7 as in FIGS. 1 to 3, increased by 200. The principal conduits 212 and 214 are made in the body 210 of the device, slide element 218 being mobile axially in a bore 216 made in the body 210 and extending in part between conduits 212 and 214.

As in the embodiment of FIGS. 1 to 3, the slide element is capable of occupying two end positions (FIGS. 5 and 7) and an intermediate position (FIG. 6). In its intermediate position, the slide element 218 places conduits 212 and 214 in communication via a communication conduit which comprises a first blind bore portion 220A which opens on the outer axial periphery of the slide valve via orifices 222, a first calibrated restriction 221A which communicates the blind bore portion 220A with a communication chamber 219, and a second calibrated restriction 221B, similar to the first, which communicates the communication chamber 219 with a second blind bore portion 220B which opens on the periphery of the slide element via orifices 224. The restrictions 221A and 221B perform a role similar to that of the restriction 21 of FIGS. 1 to 3.

The communication conduit is obturated by the wall of the bore 216 in the two end positions of the slide element 218.

However, it is observed that the first principal conduit 212 may continue to remain in communication with the chamber 219 in the first end position (FIG. 5) of the slide element, while the second conduit 214 may continue to remain in communication with this chamber in the second end position of the slide element (FIG. 7).

The portions of conduits 220A and 220B are blind, i.e. they do not join the interior of the slide element. On the other hand, they open respectively on the ends 218A and 218B of the slide element 218.

Consequently, portions 220A and 220B also perform the role of first and second communication passages, making it possible respectively to communicate the first and second principal conduits 212 and 214 with, respectively, a first control chamber 228 and a second control chamber 230. When the pressure in the conduit 212 is greater than the pressure in the conduit 214, the first control chamber 228 is filled with fluid to push the slide element into its first end position, while, in the reverse situation, it is the second control chamber 230 which is filled with fluid. In the intermediate position of the slide element shown in FIG. 6, the volume of the chambers 228 and 230 is substantially equal to half the maximum volume of each of these chambers. In effect, in the balanced situation in which the pressures in the conduits 212 and 214 are equal, the pressures are equal in chambers 228, 219 and 230 which communicate with one another via the conduits 220A and 220B with the restrictions 221A and 221B.

In the second embodiment, at least one of the first and second communication passages (formed in the example shown by portions 220A and 220B respectively) is equipped with a calibrated restriction to hinder flow of the fluid through these passages. In fact, in the example shown, the open end of the blind conduit portion 220A is equipped with a first calibrated restriction 253, while the open end of the blind conduit portion 220B is equipped with a second calibrated restriction 257. It will be understood that, from the position shown in FIG. 6, the passage of the slide element into one or the other of its two intermediate positions is possible only if one of the chambers 228 and 230 empties while, concomitantly, the other of these chambers fills with fluid. In this way, the restriction 253 serves to limit the cross-section of passage of the fluid, which amounts to hindering filling of the chamber 228 for the passage from the intermediate position to the first end position of the slide element, or to hindering emptying of this chamber 228 for the passage from the intermediate position to the second end position of this slide element. The restriction 257 has the same effect concerning the chamber 230. Insofar as the emptying of one chamber is always concomitant with the filling of the other chamber, only one of the two restrictions 253 and 257 might be provided.

The restrictions 221A and 221B make it possible to generate a drop in pressure between conduits 212 and 214 when, during restart of the motor, the pressure in the supply duct increases rapidly. The diameter of these restrictions may for example be of the order of 1 mm to 1.5 mm, while that of the restrictions 253 and 257 will rathermore be of the order of 0.1 to 0.3 mm for motors operating up to pressures of 300 bars.

In fact, in the variant of FIGS. 5 to 7, chambers 228 and 230 perform both the role of the control chambers and that of damping chambers, due to the restriction or restrictions 253 and/or 257.

The device which has just been described in relation to FIGS. 5 to 7 may be disposed, in place of that of FIGS. 1 to 3, in the block B1 of the circuit of FIG. 4, to function in the same manner. Of course, in one or the other case the circuit may be open as shown in FIG. 4 or of the "close" type in which the pump used is a pump with two directions of operation to which the supply and exhaust ducts are connected.

In the stabilized situation at stop of the mass driven by the motor, the slide element 18 or 218 normally occupies its intermediate position (the pressures are the same in the two principal conduits 12, 14 or 112, 114). This is in fact generally the case on flat ground in which, at stop, no particular stress is to be exerted on the driven mass to maintain it in position.

On the contrary, on sloping ground on in inclined position, this mass is naturally subjected to a stress (gravity) which must be compensated by the stopped motor to maintain this mass in position. Consequently, one of the principal ducts of the motor (therefore one of the principal conduits of the device of the invention) is in slight over pressure and the slide element 18 or 218 occupies its corresponding end position.

Figure 8:
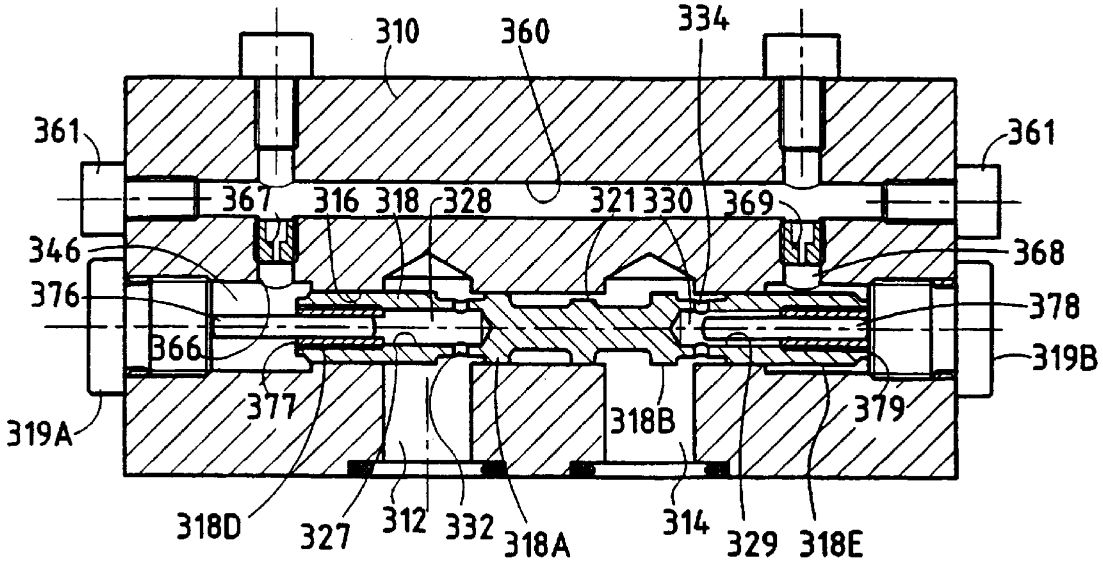
FIGS. 8 to 10 show a device according to the invention in accordance with a third embodiment, in three different situations.
Figure 10:
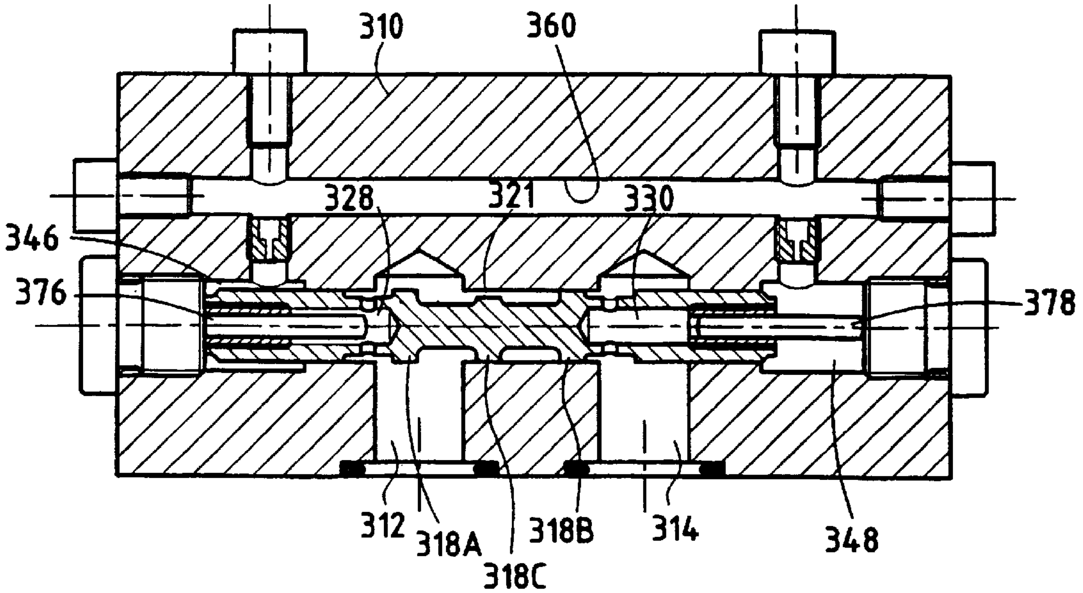

FIGS. 8 and 10 will now be described, in which elements similar to those of FIGS. 1 to 3 are given the same references, increased by 300.

Figure 9:
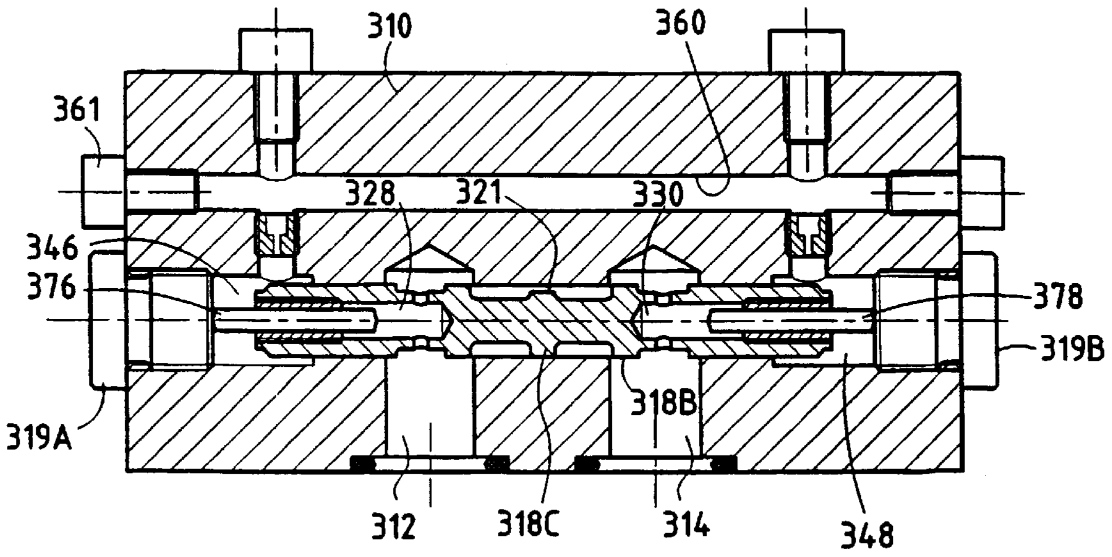

The principal conduits 312 and 314 are connected to the bore 316 made in the body 310. The slide element 318 is mobile in this bore between a first end position (FIG. 8), in which the pressure in the conduit 312 is greater than the pressure in conduit 314, and a second end position (FIG. 10) corresponding to the inverse situation. FIG. 9 shows the intermediate position of the slide element 318 in which it allows communication of conduits 312 and 314. The bore is closed at its two ends by plugs 319A and 319B respectively.

In the first and second end positions, the conduits 312 and 314 are isolated by the cooperation of the wall of the median portion of bore 316 which extends between conduits 312 and 314 with, respectively, zone 318A and zone 318B of the outer cylindrical face of the slide element.

In the intermediate position of the slide element, communication of the principal conduits 312 and 314 passes via a calibrated restriction 321 constituted, in the example shown in FIGS. 8 to 10, by a calibrated flat portion made on the zone 318C of the slide element located between the zones 318A and 318B. In the intermediate position, only this zone 318C is located in the median portion of the bore, with the result that the calibrated flat portion 321 determines the drop in pressure between the principal conduits. The communication conduit is therefore defined between this flat portion and the wall of the median portion of the bore 316.

Figure 11:
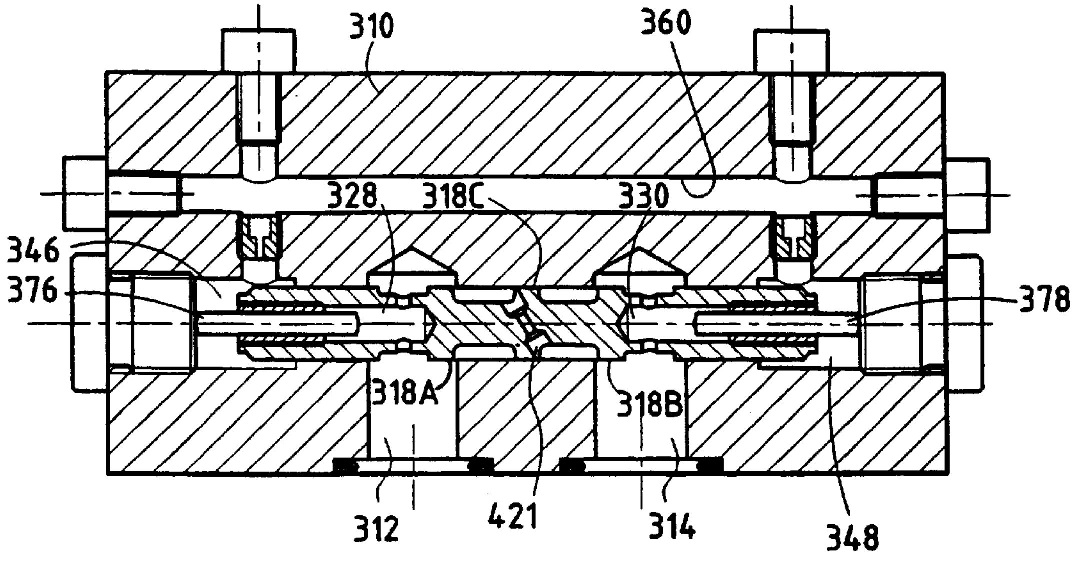
FIG. 11 illustrates a variant of the third embodiment.

FIG. 11 shows, likewise in the intermediate position of the slide element, a variant of the third embodiment of the invention, which differs from that presented in FIGS. 8 to 10 only by the form of the calibrated restriction. In FIG. 11, this restriction is produced by a calibrated bore 421 which constitutes a nozzle. In that case, the zone 318C of the slide element is dimensioned so as to establish a contact with the wall of the bore 316 by its outer surface. The nozzle 421 is pierced obliquely in this zone, so as to place the two spaces defined on either side of the zone 318C of the slide element in communication. The communication conduit is then defined by the calibrated bore 421 in the median portion of the bore 316.

Of course, the person skilled in the art might alter the embodiment of FIGS. 1 to 3 slightly, to replace the restriction 21 by a form similar to that of the calibrated restrictions 321 and 421.

The embodiment of FIGS. 8 to 11 differs from the preceding ones by the form of the means for controlling the displacement of the slide element and that of the delaying means.

For example, the control means comprise a first and a second control chamber 328 and 330 which are both arranged in the slide element 318. The first chamber 328 is permanently connected to the first principal conduit 312 while it is isolated from the second principal conduit 314. The situation is inverse for the second chamber 330 which is permanently connected to the conduit 314, being isolated from conduit 312. For example, chambers 328 and 330 are made in blind bores 327 and 329 which open out respectively on the first and second axial ends 318D and 318E of the slide element. However, as will be seen in the following, these chambers are closed towards these axial ends.

Radial bores 332 and 334 extend respectively between the bores 327 and 329 and the axial periphery of the slide element and establish permanent communication between the chamber 328 and the principal conduit 312, and the chamber 330 and the conduit 314, respectively. These bores are possibly made in grooves.

The differences in pressure between conduits 312 and 314 determine the differences in pressure between the control chambers 328 and 330, this provoking displacement of the slide element between its end positions, passing via its intermediate position.

In the example shown, the walls of the chambers 328 and 330 which are towards the ends 318D and 318E of the slide element are fixed, with the result that the increase in pressure in one of these chambers, which provokes a displacement of the slide element, is also translated by an increase in the volume of the chamber in question.

The delaying means which serve to limit the speed of passage of the slide element between one and the other of its end positions comprise a first damping chamber 346 located between the first end 318D of the slide element and the first end of the bore 316 closed by the plug 319A, as well as a second damping chamber 348, located between the second end 318E of the slide element and the second end of the bore 316 closed by plug 319B.

The chambers 346 and 348 are in permanent communication with a "buffer" fluid enclosure via at least one restriction. In the example shown, this enclosure is constituted by an axial bore 360 communicating with the chambers 346 and 348 via transverse bores 366 and 368 respectively. For the rest, the buffer enclosure is closed by plugs 361. The volume of the enclosure is constant and it therefore contains a predetermined buffer fluid volume and is permanently isolated from the principal conduits, apart from possible leakages due to functional clearances.

In the position of FIG. 8, the volume of the chamber 346 is maximum, while that of chamber 348 is zero or virtually zero. The situation is inverse in the position of FIG. 10. On the other hand, in the intermediate position shown in FIGS. 9 and 11, the two damping chambers have substantially the same volume.

It will therefore be understood that, for the slide element 318 to move from its intermediate position in order to occupy one of its end positions, it is necessary that the fluid contained in the buffer enclosure move so as to reduce the volume of a damping chamber in order to increase the volume of the other.

Restriction means, comprising at least one calibrated restriction, are disposed in the buffer enclosure to hinder this displacement of fluid. In the example shown, two restrictions 367 and 369 respectively, have been provided, respectively disposed in bores 366 and 368.

Consequently, when, from the intermediate position, the pressure in one of the principal conduits 312 and 314 becomes greater than the pressure in the other principal conduit, these conduits temporarily continue to be in communication before the slide element moves sufficiently towards one or the other of its end positions for the zone 318A or zone 318B of the slide element to prevent this communication by cooperating with the wall of the median portion of the bore 316.

The first and second control chambers 328 and 330 each present a useful surface on which the fluid pressure acts to provoke the displacement of the slide element towards its first or toward its second position, respectively. Similarly, the damping chambers 346 and 348 each present a useful surface on which the fluid pressure acts to hinder reduction of the volume of this chamber.

For each assembly of a control chamber (for example chamber 328) and of the damping chamber (for example chamber 348) associated therewith, of which emptying is necessary for the displacement of the slide element 318 in the direction controlled by an increase in the pressure in this control chamber, the ratio between the useful surface of the control chamber and the useful surface of the damping chamber constitutes a parameter for controlling the speed of displacement of the slide element in the sense of emptying the damping chamber in question.

The cross-sections of passage of the restriction means 367 and 369, as well as these ratios between the useful surfaces of the associated control and damping chambers, may be determined with the aid of simulations in order to obtain, in one or the other direction of displacement of the slide element, the desired duration of delay. In the majority of cases, equal durations of delays will be chosen for the two directions of displacement.

It has been indicated hereinbefore that chambers 328 and 330 were formed in the blind bores, closed towards the ends of the slide element. More precisely, the first control chamber 328 is separated from the first damping chamber 346 by a first cylindrical rod 376 of small cross-section which is disposed in the blind bore 327, in the same way as the second control chamber 330 is separated from the second damping chamber 348 by a second cylindrical rod 378 of small cross-section disposed in the bore 329.

The rods 376 and 378 are disposed in liners 377 and 379 respectively, in bores 327 and 329. A sliding contact (rendered substantially tight by a minimum functional clearance) is established between these rods and these liners, with the result that the rods 376 and 378 remain substantially fixed during the displacement of the slide element. The useful surface of the first control chamber 328 is determined by the surface of the free end of the rod 376 which is located in this chamber, in the same way as the useful surface of the second control chamber 330 is determined by the surface of the free end of the rod 378 which is located in this chamber.

On the other hand, the useful surface of the damping chamber 346 is a function of the cross-section of the first end of the slide element 318D, deduction possibly being made of the cross-section of the rod 376, in the same way as the useful surface of the second damping chamber 348 is a function of the cross-section of the end 31 8E of the slide element, deduction possibly being made of the cross-section of the rod 378.

Another parameter influencing the damping time is the volume displaced in the buffer enclosure and, in particular, the "damping" volume of chambers 346 and 348. The damping volume of chamber 346 is the volume of fluid which, from the intermediate position of FIG. 9, must be evacuated from this chamber during displacement of fluid in the buffer enclosure to allow a displacement of the slide element 318 over a sufficient stroke in order to close the communication between conduits 312 and 314. In general, the same damping volumes will be chosen for chambers 346 and 348.

The cylindrical rods 376 and 378 are advantageously respectively mounted freely in bores 327 and 329 (more precisely in liners 377 and 379). This facilitates assembly of these rods and avoids the problems of concentricity between the rods and the bores.

What is claimed is:

1. A valve device for at least one hydraulic motor adapted to drive a high inertia load, the motor having two main ducts, respectively for supply and exhaust of fluid, said ducts being configured and adapted to be obturated for stopping the motor, the valve device further comprising two main conduits, for connection to each of said two main ducts;

the valve device further comprising valving means and control means configured and adapted to control said valving means whereby said main conduits are placed into a communication mode, in which said main conduits communicate through said valving means when fluid pressures in said main conduits are substantially equal, and whereby said main conduits are placed into an isolation mode, in which said main conduits are isolated from one another by said valving means when the fluid pressures in said main conduits are different, and the valve device further comprising delaying means, configured and adapted to limit the speed of passage of fluid between said communication mode and said isolation mode.

2. The valve device as claimed in claim 1, wherein the valving means comprise a restricted passage having a cross-section significantly less than the cross-section of said main conduits, which restricted passage establishes communication between said main conduits during the communication mode.

3. The valve device as claimed in claim 1, wherein the valving means comprises a mobile member configured and adapted for transportation between three positions depending on the relative difference in the fluid pressures prevailing in said main conduits, including a first end position and a second end position, in which the two main conduits are isolated from each other, and an intermediate position intermediate between said first and second end positions in which said main conduits communicate with each other, the control means urging said mobile member toward said first end position when the fluid pressure in the first main conduit is greater than the fluid pressure in the second main conduit, and urging said mobile member toward said second end position when the fluid pressure in the second main conduit is greater than the pressure in the first main conduit and urging said mobile member into said intermediate position when the fluid pressures in said two main conduits are substantially equal.

4. The valve device of claim 3, wherein the mobile member is formed by a spool mounted to slide in a bore having a wall in which the two main conduits open at respective openings, the spool having means for forming a communication conduit which communicates with the openings in the intermediate position of the spool so as to connect said main conduits and which, in said first and second end positions of said spool, is obturated by said wall of the bore.

5. The valve device of claim 4, wherein said control means further comprises a first control chamber and a second control chamber, respectively located at a first and a second end of the spool, said first control chamber communicating with said first main conduit via a first communication passage and being configured and adapted to be fed with fluid when the fluid pressure in the first main conduit is greater than the fluid pressure in the second main conduit so as to urge the spool towards said first end position and to be drained when the fluid pressure in the second main conduit is greater than the fluid pressure in the first main conduit so as to allow the spool to move towards said second end position, the second control chamber communicating with the second main conduit via a second communication passage, the second control chamber being configured and adapted to be fed with fluid when the fluid pressure in the second main conduit is greater than the fluid pressure in the first main conduit so as to urge the spool towards said second end position and to be drained when the fluid pressure in the first main conduit becomes greater than the fluid pressure in the second main conduit so as to allow the spool to move towards said first end position.

6. The valve device of claim 5, wherein at least one of the first and second communication passages has a restricted portion.

7. The valve device of claim 5, wherein the first and the second control chambers respectively comprise first and second spool end walls with which the first and the second end of the spool are respectively adapted and configured to abut each other, said end walls being movable in the direction of slide of the spool, and the valve device further comprises a first return means and a second return means respectively urging said first end wall toward the second end wall.

8. The valve device of claim 7, further comprising a first damping chamber communicating with the first main conduit via a first communication and damping passage, and a second damping chamber communicating with the second main conduit via a second communication and damping passage, said first and second communication and damping passages having respective restrictions so as to hinder the flow of the fluid through said passages at least during draining of said damping chambers.

9. The valve device of claim 8, wherein the first and the second damping chambers each communicate with the respective first and second main ducts via first and second booster passages, respectively, each booster passage having a non-return valve.

10. The valve device of claim 5, wherein the first and the second control chambers are disposed in two respective ends of said spool.

11. The valve device of claim 10, wherein said first and second damping chambers are disposed within the bore at the respective ends of said spool.

12. The valve device of claim 6, further comprising a first damping chamber disposed between a first end of said pool and a first end wall of the bore, and a second damping chamber disposed between the second end of said spool and a second end wall of said bore, said first and second damping chambers being in permanent communication with a closed enclosure containing a volume of buffer fluid.

13. The value device of claim 12, wherein a calibrated restriction means is disposed within said closed enclosure.

14. The valve device of claim 12, wherein the first control chamber is disposed within a first blind bore opening on the first end of said spool and a first cylindrical rod is inserted in said bore so as to close said first bore, thereby separating said first control chamber from said first damping chamber, and wherein said second control chamber is disposed within a second blind bore opening on the second end of said spool and a second cylindrical rod is disposed within said second bore so as to close said second bore, thereby separating said second control chamber from said second damping chamber.

15. The valve device of claim 1, wherein said valving device further comprising a part of a hydraulic unit intended to be fixed on the casing of a hydraulic motor.

16. A valve device as claimed in claim 1, wherein the valving means comprise a mobile member adapted to be urged by said control means between at least two positions respectively corresponding to said communication mode and to said isolation mode and wherein the control means comprise at least one control chamber adapted to communicate with at least one of the first and second main ducts.

17. A valve device as claimed in claim 4, wherein said means for forming a communication conduit include at least one restricted passage having a much smaller cross-section than a cross-section of the main ducts.

18. A valve device as claimed in claim 17, wherein the control means comprise respective first and second control chambers, respectively located at first and second ends of the spool, the first chamber communicating with the first main conduit via a first communication passage and being adapted and configured to be fed with fluid when the fluid pressure in the first main conduit becomes greater than the fluid pressure in the second main conduit so as to urge the spool towards said first position thereof and to be drained when the fluid pressure in the second main conduit becomes greater than the fluid pressure in the first main conduit so as to allow the spool to move towards said second position thereof, the second chamber communicating with the second main conduit via a second communication passage and being adapted to be fed with fluid when the fluid pressure in the second main conduct becomes greater than the fluid pressure in the first main conduit so as to urge the spool towards said second position thereof and to be drained when the fluid pressure in the first main conduit becomes greater than the fluid pressure in the second main conduit so as to allow the spool to move towards said first position thereof.

19. A valve device as claimed in claim 8, wherein at least one of said first and second communication passages has a restricted portion.

20. A valve device as claimed in claim 19, further comprising a first damping chamber located between the first end of the spool and a first end wall of the bore, and a second damping chamber located between the second end of the spool and a second end wall of the bore, said first and second damping chambers permanently communicating with a closed enclosure which contains a volume of buffer fluid.

21. A valve device as claimed in claim 20, wherein the closed enclosure comprises a calibrated passage between said first and second damping chambers.

22. A valve device as claimed in claim 21, wherein the first control chamber is made in a first blind bore opening on the first end of the spool, a first cylindrical rod being inserted in said bore so as to close the latter and to separate said first control chamber from the first damping chamber, and wherein the second control chamber is made in a second blind bore opening on the second end of the spool, a second cylindrical rod being inserted in said bore so as to close the latter and to separate said second control chamber from the second damping chamber.

* * * * *